United States Patent
Skog et al.

(10) Patent No.: US 7,817,554 B2
(45) Date of Patent: *Oct. 19, 2010

(54) METHODS AND DEVICES FOR CHANGING QUALITY OF SERVICE

(75) Inventors: Robert Skog, Hasselby (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1231 days.

This patent is subject to a terminal disclaimer.

(21) Appl. No.: 11/171,279

(22) Filed: Jul. 1, 2005

(65) Prior Publication Data

US 2006/0002377 A1 Jan. 5, 2006

(30) Foreign Application Priority Data

Jul. 5, 2004 (SE) .................................. 01102/04

(51) Int. Cl.
*G01R 31/08* (2006.01)
(52) U.S. Cl. ...................... 370/235; 370/342; 370/352; 455/452.2
(58) Field of Classification Search ................ 370/342, 370/235, 352; 455/452.2
See application file for complete search history.

(56) References Cited

U.S. PATENT DOCUMENTS

| | | | |
|---|---|---|---|
| 6,728,208 B1 | 4/2004 | Puuskari | |
| 7,209,458 B2 | 4/2007 | Ahvonen | |
| 2002/0093936 A1* | 7/2002 | Chuah | 370/349 |
| 2002/0093979 A1* | 7/2002 | Chen et al. | 370/466 |
| 2003/0081592 A1 | 5/2003 | Krishnarajah | |
| 2003/0087649 A1 | 5/2003 | Bhatia et al. | |
| 2003/0095540 A1 | 5/2003 | Mulligan | |
| 2003/0108015 A1 | 6/2003 | Li | |
| 2003/0186692 A1* | 10/2003 | Tamura | 455/422.1 |
| 2004/0064555 A1* | 4/2004 | Cuny et al. | 709/225 |
| 2004/0105415 A1 | 6/2004 | Fujiwara et al. | |
| 2005/0249238 A1* | 11/2005 | Haumont | 370/466 |
| 2006/0143159 A1* | 6/2006 | Chowdhury et al. | 707/3 |
| 2007/0230342 A1* | 10/2007 | Skog | 370/232 |

FOREIGN PATENT DOCUMENTS

| | | |
|---|---|---|
| JP | 2003-508987 | 3/2003 |
| JP | 2004-096216 | 3/2004 |

(Continued)

OTHER PUBLICATIONS

International Search Report mailed Feb. 11, 2005 in corresponding PCT Application PCT/SE2004/001102.

(Continued)

*Primary Examiner*—Duc C Ho
(74) *Attorney, Agent, or Firm*—Nixon & Vanderhye P.C.

(57) ABSTRACT

Quality of Service parameters are changed to adapt a transmission to varying transmission capacity demands. During an ongoing communication session, at least one client terminal utilizes services provided via a network node, and initial quality of service parameters are used. In the process of responding to a content request originating from the client terminal, it is determined if a delivery of the response to the content request would benefit from a modification of quality of service parameters. If the modification is determined to be beneficiary, a modification 520 of quality of service parameters for use in the response to the content request is initiated.

38 Claims, 7 Drawing Sheets

FOREIGN PATENT DOCUMENTS

| WO | 00/41426 | 7/2000 |
|---|---|---|
| WO | WO 01/17291 | 3/2001 |
| WO | 01/41376 | 6/2001 |
| WO | 02/41592 | 5/2002 |
| WO | 03/049348 A2 | 6/2003 |
| WO | WO 2004/036845 | 4/2004 |
| WO | 2004/082224 | 9/2004 |
| WO | WO 2006/004466 | 1/2006 |
| WO | WO 2006/004467 | 1/2006 |
| WO | WO 2006/004472 | 1/2006 |

OTHER PUBLICATIONS

Related U.S. Appl. No. 11/156,488, filed Jun. 21, 2005; Inventor: Skog et al.

Related U.S. Appl. No. 11/571,635, filed Jan. 4, 2007; Inventor: Skog et al.

ETSI TS 123 07 V5.9.0 (Mar. 2004), Digital cellular telecommunications system (Phase 2'); Universal Mobile Telecommunications System (UMTS); End-to-end Quality of Service (QoS) concept and architecture (3GPP TS 23.207 version 5.9.0 Release 5).

Summary of Japanese official action, Jul. 24, 2009, in corresponding Japanese Application No. JP 2007-519148.

Office Action mailed Jun. 12, 2009 in co-pending U.S. Appl. No. 11/156,488.

Office Action mailed Sep. 21, 2009 in co-pending U.S. Appl. No. 11/571,635.

Office Action mailed Oct. 15, 2009 in co-pending U.S. Appl. No. 11/571,636.

\* cited by examiner

METHODS AND DEVICES FOR CHANGING QUALITY OF SERVICE

CROSS-REFERENCE TO RELATED APPLICATIONS

This application is related to commonly-assigned co-pending international patent application No. PCT/SE2004/001087, entitled "Binding Mechanism for Quality of Service Management in a Communication Network", filed on Jul. 5, 2004; international patent application No. PCT/SE2004/001103, entitled "Methods and Devices for Supplying Quality of Service Parameters in HTTP Messages", filed on Jul. 5, 2004; and international patent application No. PCT/SE2004/001086, entitled "Devices and Methods for Push Message Initiated Service", filed on Jul. 5, 2004, the disclosures of which are incorporated herein by reference.

FIELD OF THE INVENTION

The present invention relates to methods and devices in mobile communication systems offering packet data service. In particular the invention relates to the changing of Quality of Service parameters to adapt a transmission to varying transmission capacity demands.

BACKGROUND

Modern mobile communication systems providing packet switched services, such as Universal Mobile Telecommunication System (UMTS) should be capable of supporting a large and diverse variety of applications having different demands on needed transmission capacity, sensitivity to delays in the transmission and demands on interactivity, for example. The applications range from a simple transfer of a text message, which is an example of an application that does not require high capacity nor is time critical, to video conferencing, which is a real time application requiring high transmission capacity. The concept of Quality of Service (QoS) was introduced to ensure that an end user, running an application, receives the system resources required for that particular application. At the same time, by not using more recourses than necessary for the application, the use of QoS contributes to the optimization of the use of the system resources, in particular the scarce radio resources. How QoS is implemented in UMTS is described in the technical specifications 3GPP TS 23.107 V6.1.0 (2004-03) and 3GPP TS 23.207 V6.2.0 (2004-03).

Illustrated in FIG. 1 is a generic mobile communication system wherein QoS may be utilized. The mobile communication system 100 comprises a client terminal 105 which may communicate with a network node, for example an application server 120, to use service provided by a service provider, for example. The client terminal 105 should be seen as a representation of various equipment, including, but not limited to, mobile (cellular) phones, laptop computers and PDAs with communication abilities, and is also commonly referred to as User Equipment (UE) or Mobile Station (MS). A radio access network (RAN) 125, a core network (CN) 130 and a service network (SN) 135 are involved and interacting in providing the communication between the client terminal 105 and the application server 120.

In UMTS QoS is defined with a set of attributes that specifies the UMTS bearer service. The UMTS QoS attributes are the following:
Traffic class
Maximum bit-rate
Guaranteed bit-rate
Delivery order
Maximum SDU size
SDU format information
SDU error ratio
Residual bit error ration
Delivery of erroneous SDUs
Transfer delay
Traffic handling priority
Allocation/Retention Priority
Source statistics descriptor
Signalling Indication These attributes can be mapped to the pre-defined UMTS QoS classes: Conversational class, Streaming class, Interactive class and Background class. The QoS classes are specified to the communication system by the Packet Data Protocol (PDP) context.

FIG. 2 illustrates schematically communication between a client terminal 105 and the application server 120 in UMTS. The communication occurs via the RNC (Radio Network Controller) 205 and the main nodes SGSN (Serving GPRS support node) 210 and GGSN (Gateway GPRS support node) 215 of the CN 130, to the application server 120 in the SN 135.

In the UMTS implementations the QoS classes are negotiated and managed by using PDP context management. Application level QoS requirements are mapped to PDP context parameters in the client terminal. Pre-configurations of PDP contexts are made in the client terminal such that when a packet switched application starts and connects to the network a matching pre-configured PDP context is activated. This PDP context has a selected QoS class that should match the desired QoS requirements of the application. If for instance the application is a WAP browser or MMS client, the QoS class of the activated PDP context is usually the Interactive class. Illustrated in FIG. 2 with an arrow 220, is the PDP context, defining the required QoS class, originating from the client terminal 115 and received by the GGSN 215.

Today an application, or service node, for example a WWW server may influence the selection of QoS class performed in the client terminal by the Session Description Protocol (SDP). The WWW server may want, in order to effectuate a streaming session, for example, to use a another bearer better suited for the download, than the already in use. The WWW server may then issue a SDP document to the client terminal, specifying the desired QoS class. Subsequently, the client terminal will have to initiate the actual change of QoS, before the downloading can be performed.

As described above the system trusts all terminals to either determine required QoS or to correctly handle the QoS information in the SDP message, and to negotiate with system nodes such as the RNC 205, SGSN 210 and GGSN. However, in a scenario of a larger number of different 3G terminals, from a large plurality of vendors, it is plausible that not all terminals will comply perfectly to the standard. However, it would still be of high importance for a service provider, for example, to be able to ensure that the offered application can be correctly used by the end user. Further, certain changes in the QoS requirements that would be favourable can not be easily foreseen by the terminal.

SUMMARY

An object of the present invention is to provide devices and methods that allow a for a network node, or an application in an network node, in the service network to determine appropriate QoS parameters for a bearer service between the client terminal and the application, and to initiate an update of quality of service.

A method and an arrangement in a network node are provided so that the network node may identify a requirement for changing quality of service parameters during an ongoing communication session and initiate a modification of quality of service parameters. The process is initiated by and controlled by an application in the network node. The method in the network node determines, in the process of responding to a content request originating from the client terminal, if a delivery of the response to the content request would benefit from a modification of quality of service parameters. If the modification is determined to be beneficiary, a modification of quality of service parameters for use in the response to the content request, is initiated by the network node.

The method is applicable during an ongoing communication session wherein at least one client terminal utilizes services provided via the network node, and wherein initial quality of service parameters are used in the ongoing communication session. In the process of responding to a content request originating from the client terminal method comprises the steps of:

determining upon a content request issued by the client terminal, second quality of service parameters associated to a response to said request;

comparing the initial quality of service parameters with the second quality of service parameters to determine a requirement for modifying quality of service parameters; and modifying, if a requirement of modification is identified in the comparing/determining steps, quality of service parameters by issuing to the client terminal, an update from the initial quality of service parameters to the second quality of service parameters.

Whereby the method facilitates a delivery of a response to the content request with the use of the second quality of service parameters, which are better suited for the content type and or content size. The step of comparing quality of service parameters may preferably comprises a substep of retrieving information on the initial quality of service parameters from a session database. The method may advantageously include a further step of returning to the use of the initial quality of service parameters after completion of the response to the request.

In the step of comparing quality of service parameters, a requirement for modifying quality of service parameters is identified if the initial quality of service parameters correspond to a lower transfer rate than the transfer rate corresponding to the second quality of service parameters. The initial and second quality of service parameters may for example refer to quality of service classes, for example the pre-defined UMTS quality of service classes comprising: conversational class, streaming class, interactive class and background class.

The step of determining second QoS parameters comprises the substeps of:

receiving a message from the second network comprising the content and information on at least the file type of the content; and determining second QoS parameters based on said information on the file type of the content by comparison with a predetermined list, said list linking file types to suitable QoS parameters.

According to a fourth aspect of the method of present invention the step of determining second QoS parameters comprises the substeps of:

receiving a message from the second network node as a response of the content request, wherein the requested content and information on required QoS parameters for delivering the content to the client terminal are comprised within said message; and reading from the message the information on required QoS parameters and determining second QoS parameters based on said information on required quality of service parameters.

The present invention, the network node is provided with:

quality of service determining means, adapted to, on an content request issued by the client terminal, determine second quality of service parameters associated to the requested content.

quality of service modification means adapted to issue an update from the initial quality of service parameters to the second quality of service parameters, by the use of an update PDP context message.

As a result, network node may identify that a response to a content request would benefit from a change of quality of service parameters during an ongoing communication session. If appropriate the network node initiates and effectuates the change of quality of service parameters.

One advantage is that the communication system better adapts to varying needs in bearer capacity, typically occurring in a browsing-downloading scenario, wherein media files are downloaded via the network node to the client terminal.

A further advantage is a more efficient uses of the scarce radio resources is made possible, since unnecessary high quality of service, i.e. high bearer capacity, is avoided at times then not explicitly needed.

Yet a further advantage is that since high bearer capacity is used only then explicitly necessary the power consumption is kept at a minimum. This is of greatest importance in user equipment since the battery life hence is prolonged.

Further advantages and features of embodiments will become apparent when reading the following detailed description in conjunction with the drawings.

BRIEF DESCRIPTION OF THE DRAWINGS

FIG. 6 is a signal/message sequence scheme illustrating an example embodiment of;

DETAILED DESCRIPTION

Figure 1:
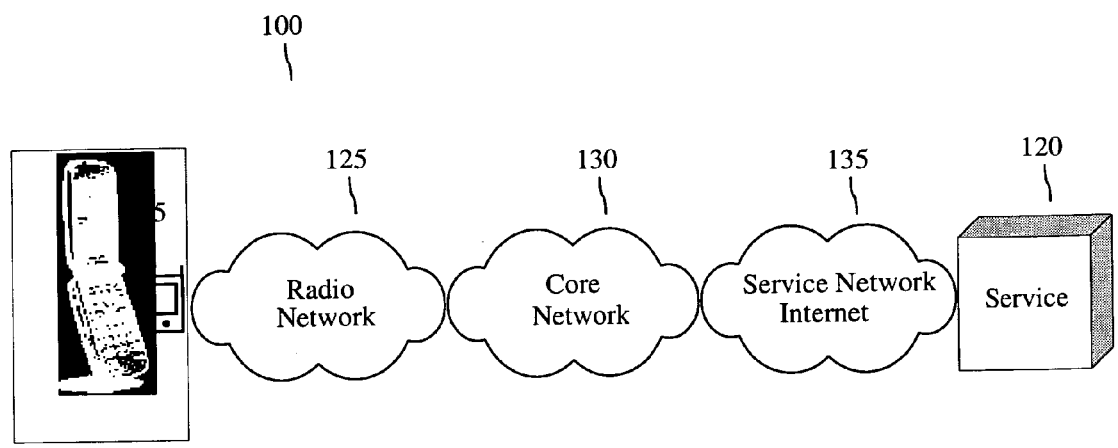
FIG. 1 is a schematic illustration of a generic mobile communication system.
Figure 2:
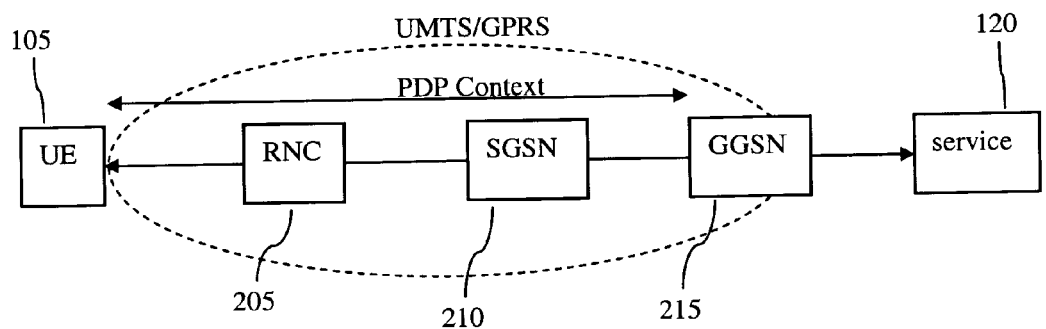
FIG. 2 is a schematic illustration of the use of PDP context in a mobile communication system.

The technology will now be described more fully hereinafter with reference to the accompanying drawings, in which preferred example embodiments shown. This technology may, however, be embodied in many different forms and should not be construed as limited to the embodiments set forth herein; rather, these embodiments are provided so that this disclosure will be thorough and complete. In the drawings, like numbers refer to like elements.

The technology is applicable to packet switched services in a mobile communication system, which services typically are provided by a service provider and utilized by an end user with the aid of a client terminal. In particular the technology relates, but is not limited, to scenarios wherein the end user is browsing web-pages or the like to find and download content such as music, pictures and movie clips, which hereinafter will be referred to as media files. A usage that is characterized by very varying demands on the transmission capacity—for the browsing a "best effort" transmission often suffice, while a download of a media file, for example, impose very high demands on the transmission capacity. An objective is to accommodate to the rapid changes in demands of transmission capacity during certain applications such as downloading of media files.

Described on a high level, a method and an arrangement in a network node are provided so that the network node may identify a requirement for changing quality of service parameters during an ongoing communication session and initiate a modification of quality of service parameters. The process is initiated by and controlled by the network node or an application in the network node. The method in the network node determines, in the process of responding to a content request originating from the client terminal, if a delivery of the response to the content request would benefit from a modification of quality of service parameters. If the modification is determined to be beneficiary, a modification of quality of service parameters for use in the response to the content request, is initiated by the network node.

Figure 3A:
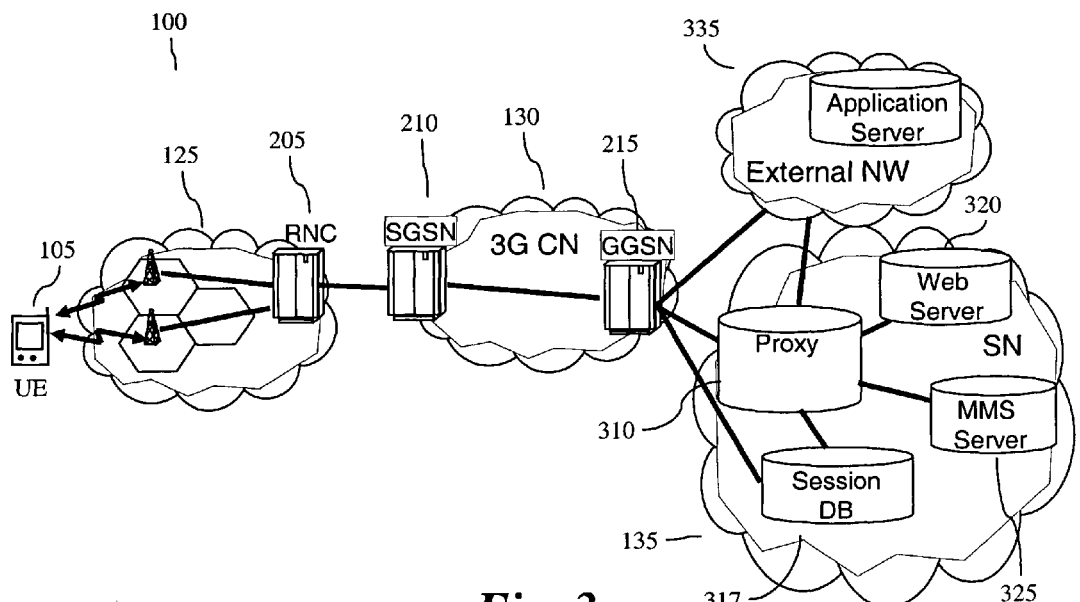
FIG. 3a is a schematic illustration of a mobile communication system therein the method and arrangements according to the present invention may by used, and 3b is a schematic illustration of the functional parts implemented as software code means of the network node according to the invention.

FIG. 3 is a schematic view of a mobile communication system. The mobile communication system 100 comprises a client terminal 105 which may communicate with a network node 310 of a service provider and thereby receive a service that is offered by the service provider. The network node 310 is typically a proxy for the client terminal 105 in the utilization of a WWW-server 320. The communication between the client terminal 105 and the network node 310, typically involves three separate but interconnected networks, the radio access network (RAN) 125, the core network (CN) 130 and the service network (SN) 135. Possible radio access networks 125 includes, but is not limited to, WCDMA, CDMA2000, Wireless LAN or GPRS network. The core and service networks are commonly realized as IP-based or ATM-based communication networks.

The client terminal 105 resides in the radio access network (RAN) 125, which is controlled by at least one Radio Network Controller (RNC) 205 which is in communication with a Serving GPRS support node (SGSN) 210 of the core network 130. The CN 130 are via Gateways nodes in communication with other networks. The Gateway GPRS support node (GGSN) 215 interconnects the CN 130 with the service network 135. The GGSN may further communicate with a session database 317. The network node 310, or proxy, of which the client terminal 105 communicates is part of the service network 135, and may in turn be connected to a further networks node providing the actual service, for example a WWW server 320, an MMS server 325 or other types of application servers. All of which are part of the service network 135. The network node 310, or proxy, may also be in connection to servers which are not part of the service network 135, but belongs to external networks 335.

Figure 5A:
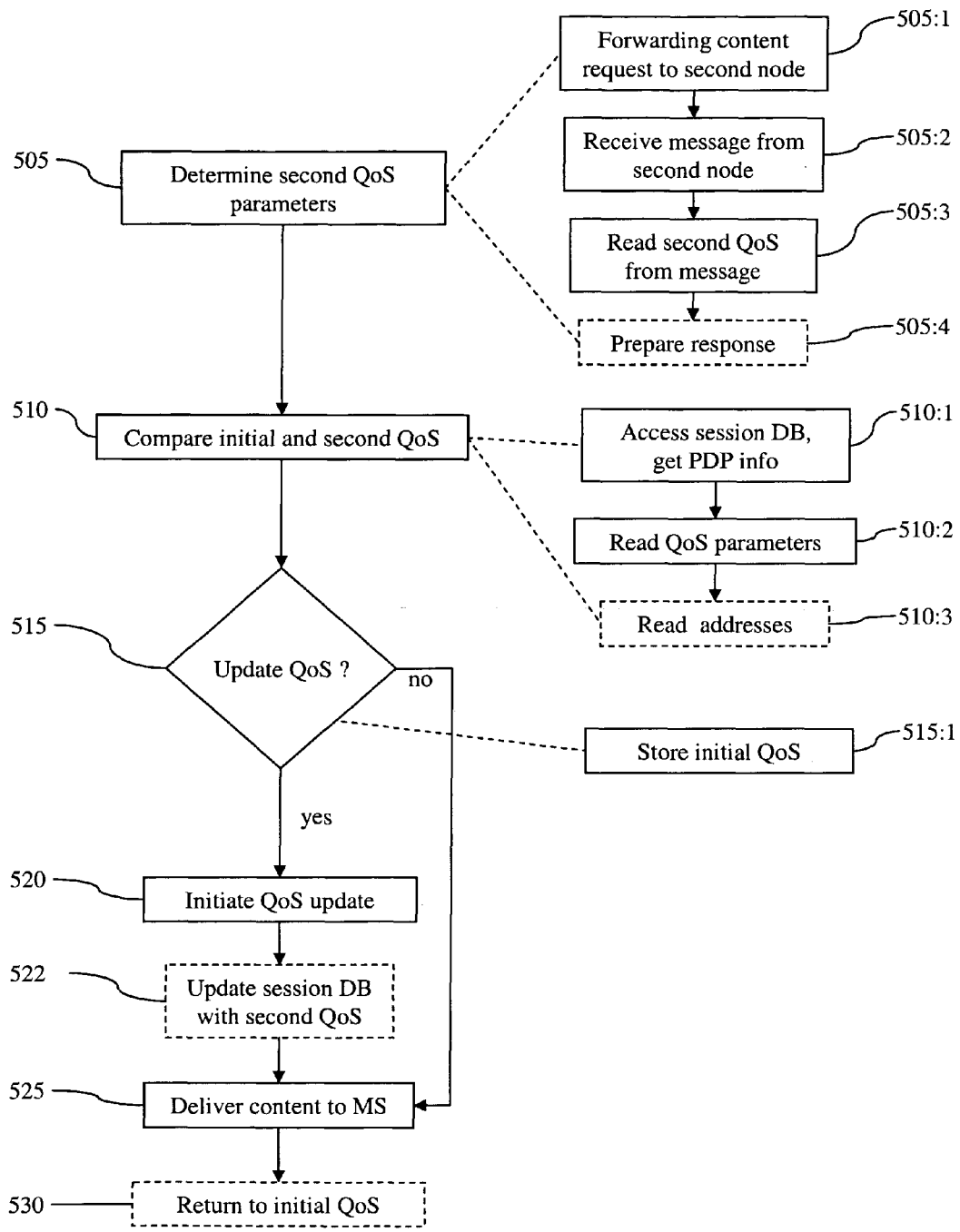
FIG. 5a is a flowchart of a method.
Figure 5B:
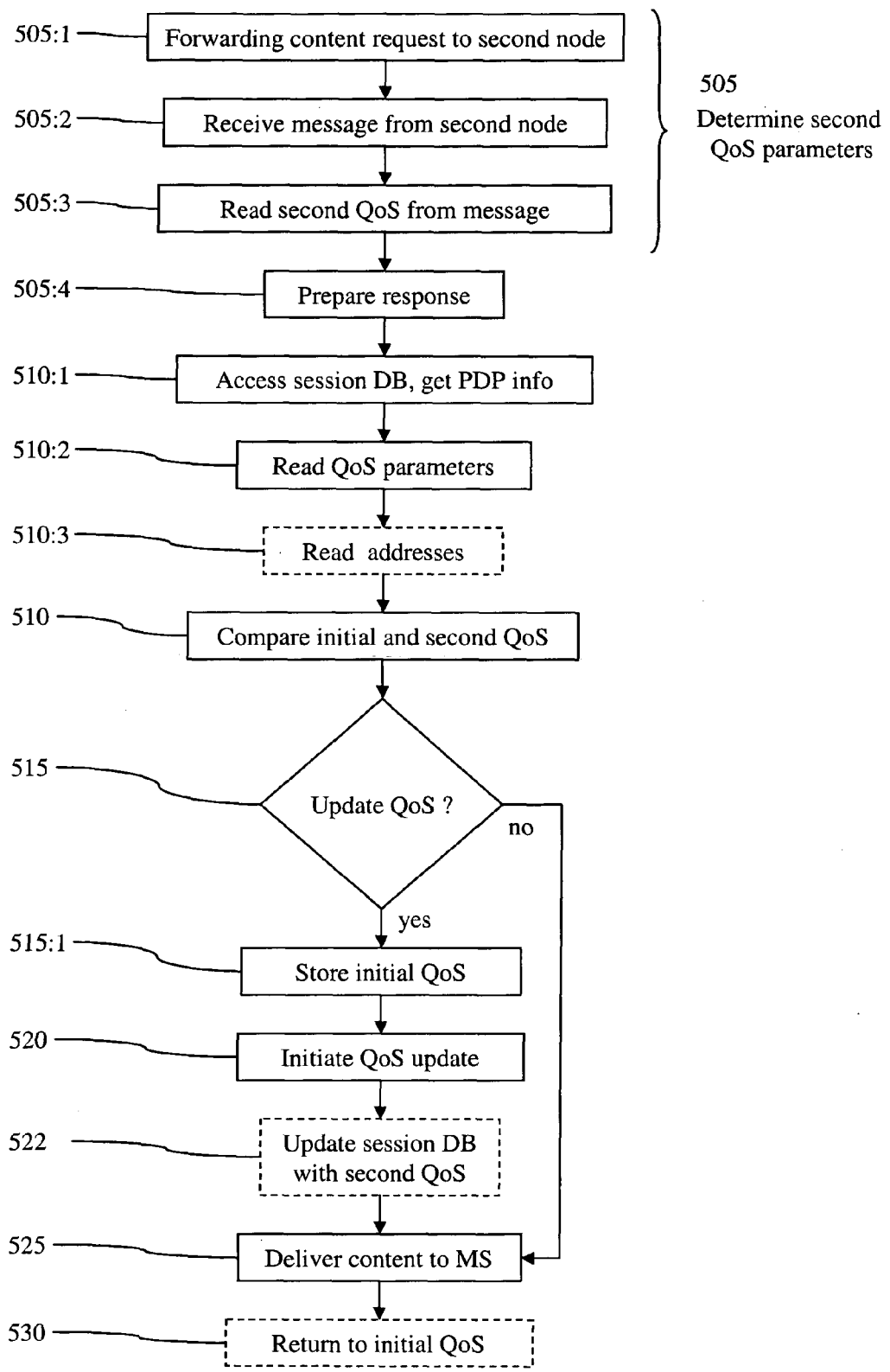
FIG. 5b is a flowchart of a preferred example embodiment.
Figure 6:
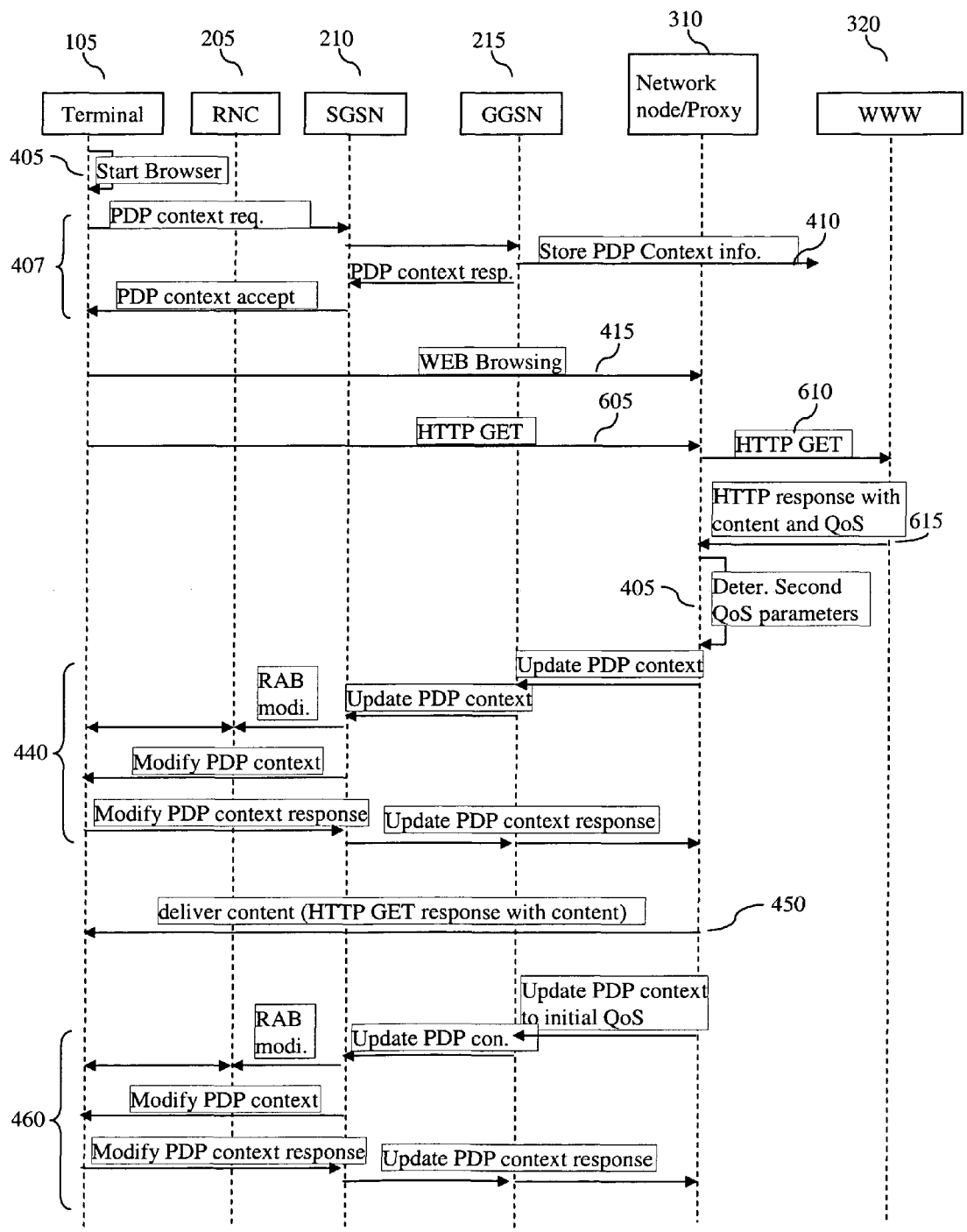

The method and arrangement will be described in an UMTS network and with reference to the schematic signalling scheme depicted in FIG. 4 and the flowchart of FIG. 5a. Example embodiments are illustrated in FIG. 5b and FIG. 6

Figure 4:
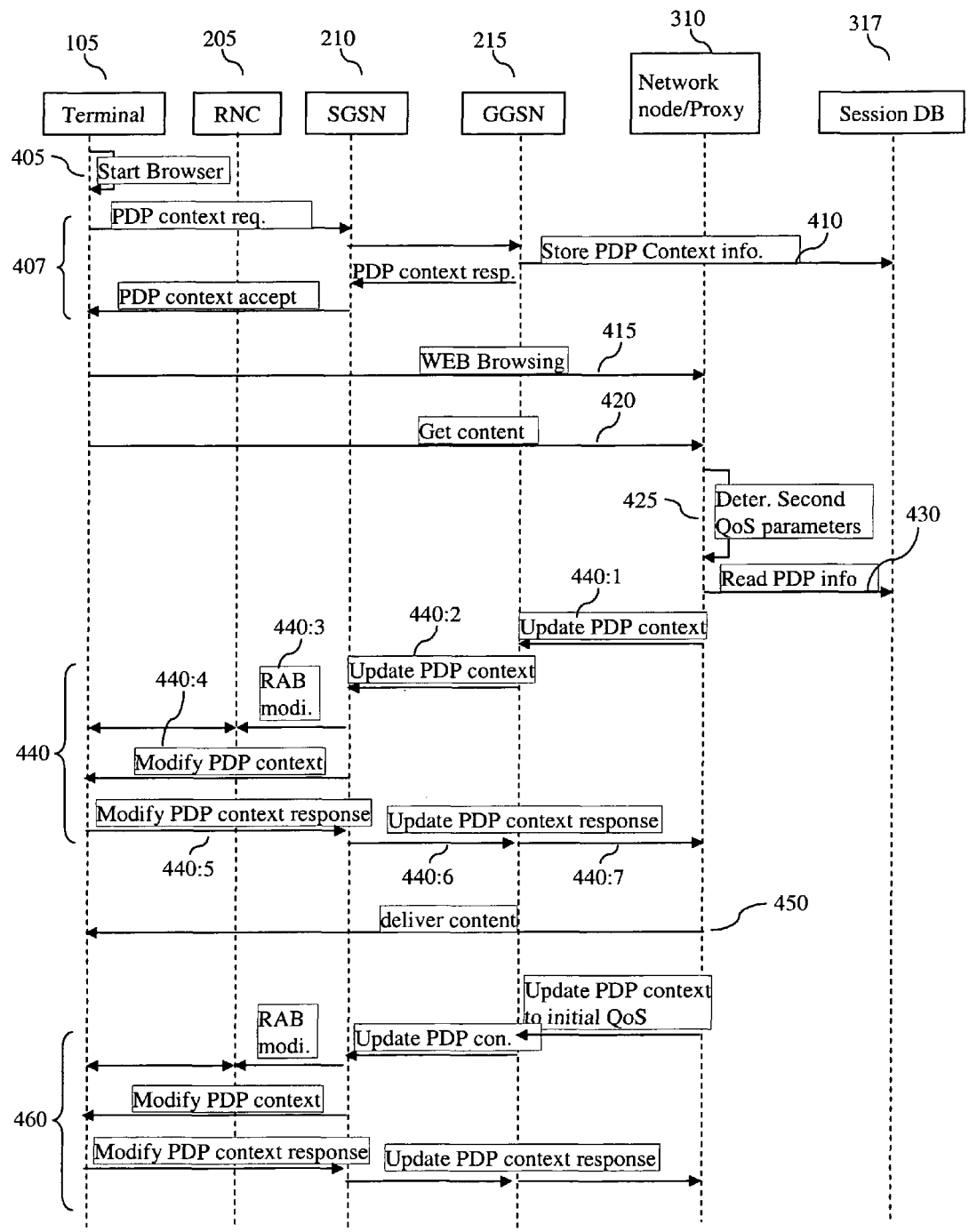
FIG. 4 is a signal/message sequence scheme illustrating a method.

The method is applicable during a communication session between the client terminal 105 and the network node 310, as illustrated by the signalling scheme of FIG. 4. On an application layer the communication is between an terminal application, for example a browser 405, and the application of the service provider 410, via the proxy application 415 in the network node 310. The communication session has been set up according to the standard procedures which are known in the art.

A communication session typically begins with an end user initiating a packet service application in the client terminal 105, by starting a WEB browser 405, for example. In UMTS PDP context management is used to set up the session with appropriate QoS class, among other parameters. Upon starting an application in the client terminal 105 the application level QoS requirements are mapped to PDP context parameters in the client terminal, typically by activation of a pre-configured PDP context specifying a QoS class which should match the applications QoS requirements. A negotiation process involving the SGSN 210 and the GGSN 215, establish initial QoS parameters to be used in the communication session, as illustrated in the set up part 407 of FIG. 4. The GGSN stores PDP context information in the session data base, indicated by arrow 410. After completion of the set up the communication session proceeds with the establishment of the application level communication, arrow 415, in the current example a WEB browsing session, between the application (browser) in the client terminal 105 and the proxy application of the network node 310.

During the web browsing a content request is issued from the application of the client terminal 105, for example a request of downloading a media file from the WWW server, arrow 420. One example of a content request is a "Get content" message issued to the proxy application of the network node 310.

The network node 310 responds to the content request by retrieving the requested content from the service provider server, for example (not shown) and determines second QoS parameters 425 associated to the content. The association of QoS parameters to the content will be further discussed below.

The network node 310 further determines if a modification of the QoS parameters used in the session would benefit the delivery of the content to the client terminal 105 by comparing the initial QoS parameters with the second QoS parameters. The network node 310 preferably retrieves information on the initial QoS parameters from the PDP context information stored in the session database 317, as indicated by arrow 430.

If the network node 310 has determined a change to the second QoS parameters, e.g. if the initial QoS parameters corresponds to a lower QoS class than the second QoS parameters, the network node 310 initiates a process for modifying 440 the QoS parameters used in the session. The network node 310 issues an update of PDP context, to the GGSN 215. The network node 310 needs to have information on which GGSN 215 to address, and preferably also include information which the GGSN 215 may use to identify the client terminal 105. Preferably, the network node 310 retrieves this information from the session database 317, which will be further discussed below. The further PDP updating process, arrows 440: 2, 3, 4, 5, 6, involves the GGSN 215, SGSN 210, RNC 205 and the client terminal 105 is performed according to the standard, and hence is well known for the skilled in the art. The GGSN 215 forwards the PDP context response issued by the client terminal 105 to inform the network node 100 of the result of the updating process, arrow 440:7.

The result of the updating process is either that the communication is now occurring according to the requested QoS defined by the second QoS parameters, or that it was not possible to comply to the requested update, for example due to temporary constrains in the radio environment. In the latter case the updating process may result in a QoS that is lower than the requested (second QoS parameters), but possibly higher than the initial QoS parameters. The network node 310 will then have to decide if the content should be delivered with the available QoS or if the process should be abandoned. In most cases a media file will be practically impossible to transfer, or at last highly inconvenient, below a certain transfer right. Accordingly, the network node 310 should in most cases choose to abandon the delivery process if the suitable QoS can not be used. Information on if lower QoS than the requested could still be used for the content (file type) in question, may be included in the second QoS parameters or communicated to the network node 310 by other means.

The application of the network node 310 may further check if the requested QoS comply with the capabilities of the client terminal 105 and with the restrictions of the end user's subscription. A process often referred to as policy check, and which is known in the art. An improved policy check, that may be advantageously utilized is taught in the above referred application "Binding Mechanism for Quality of Service Management in a Communication Network".

Upon completion of the Update PDP context, the network node 310 delivers the requested content to the client terminal 105, arrow 450, wherein the second QoS parameters are used.

The network node 310 may after completion of the delivery of the media file, for example, initiate a return to the initial QoS parameters 460. This is performed by an Update PDP context, identical to the Update PDP context described above.

The process of changing QoS during the communication session is according to the method of the invention initiated and controlled from the network node 310. The method in the network node 310 is illustrated in the flowchart of FIG. 5 and comprises the steps of:

505: Determining, on an content request issued by the client terminal 105, second QoS parameters, or a representation of second QoS parameters, associated to the requested content.

510: Comparing the initial QoS parameters with the second QoS parameters.

515: Determining if the QoS parameters should be updated, based on the comparison in step 510. If the second QoS parameters indicate a QoS that is higher, i.e. requires higher bearer capacity, than the QoS in use (the initial QoS parameters) a requirement for updating QoS parameters is identified, for effectuating the content delivery. If not, the content delivery may be performed with the initial QoS parameters, i.e. the QoS parameters do not need to be updated.

520: Initiate a modification, if a requirement of modification is identified in the determining step, of quality of service parameters by issuing an update from the initial quality of service parameters to the second quality of service parameters.

525: Delivering the requested content to the client terminal 105 with the use of the second QoS parameters.

The method may in addition comprise the optional steps of:

522: Optionally accessing the session database 317 to update the PDP information with the second QoS parameters. The step to be taken after the modifying step 520 and prior to the delivering step 525.

530: Returning to the use of the initial QoS parameters by issuing an update from the second QoS parameters to the initial QoS parameters similar to step 520. The step to be taken after the delivering step 525.

The step 510 of comparing the initial QoS parameters with the second QoS parameters, may comprise the substeps of:

510:1 Accessing the session database 317 to retrieve the PDP information associated with the communication session.

510:2 Reading from the PDP information the initial QoS parameters. The QoS are preferably stored as "Negotiated QoS" defined in the 3GPP TS 24.008.

510:3 Optionally reading addressing information from the PDP information.

The step 515 of determining if the QoS parameters should be updated may comprise the substeps of:

515:1 Storing temporarily the initial QoS parameters to be used in the optional returning to the initial QoS parameters.

The information optionally read by the network node 310 in step 510:3 may primarily be used for the application to find end-users GGSN 215 and for the GGSN 215 to map the request to the right GTP (GPRS Tunnel Protocol), i.e. to find the GTP associated with the client terminal 105. Table 1 specifies information concerning addressing that is contained (among other information) in the PDP information of the session database 317 related to the ongoing communication session.

TABLE 1

| Attributes in the Session database | |
|---|---|
| NAS IP Address | The IP address of the RADIUS client that sent the request. This is usually the IAS or GGSN. |
| IP Address | The IP address that is allocated to the terminal. |
| Calling Station Id (MSISDN) | The MSISDN of the connected terminal |
| IMSI | The International Mobile Subscriber Identity |
| Negotiated QoS | The negotiated quality of service as defined in 3GPP TS 24.008 |

An address associated to the GGSN 215, for example the NAS IP address or an URL/URI can be used by the application of the network node 310 to send the "Update-PDP-request" to the right GGSN 215. The identification means associated to a terminal or a subscription, the IMSI or the MSISDN can preferably be included in the message from the network node 310 for the GGSN 215 to find the right GTP. Alternatively the session database is updated with a GTP identifier, which directly identifies the GTP of the ongoing communication session. A further alternative is to use the IP-address of the client terminal 105, if such is provided in the PDP information.

The step 505 of determining second QoS parameters, or a representation of second QoS parameters, associated to the requested content may be performed in a various of ways.

In one embodiment of the invention the application of the network node 310 determines the second QoS parameters by analysing the type of content that has been requested, for example by identifying the file type, which typically is provided in a file header of the content file. The application of the network node 310 may then compare the file type with a predetermined "file-type—QoS parameters" concordance list, and select the second QoS parameters as the QoS parameters corresponding to the file type. The step 505 of determining second QoS parameters, or a representation of second QoS parameters may according to this embodiment comprises the substeps of:

505:a Forwarding the content request to a second network node, for example a service provider server.

505:b Receiving a message from the second network comprising the content and information on the file type of the content and possibly the size of the file;

505:c Determining second QoS parameters based on said information on the file type of the content and/or the size of the file by comparison with a predetermined list linking file types to suitable QoS parameters or with a predetermined list linking file types in predetermined file size ranges to suitable QoS parameters.

In a preferred embodiment of the invention the QoS parameters or a representation of the QoS parameters are provided within the same message as the content. The step 505 of determining second QoS parameters, or a representation of second QoS parameters will according to the preferred embodiment comprises the substeps of:

505:1 Forwarding the content request to a second network node, for example a service provider server.

505:2 Receiving a message from the second network node as a response of the forwarded content request of step 505:1. Contained within the message is the requested content and information on required QoS parameters for delivering the content to the client terminal 105.

505:3 Reading from the message the information on required QoS parameters and determining second QoS parameters based on said information on required quality of service parameters. The required QoS parameters may be in a format directly usable as the second QoS parameters, a specification of a QoS class or a alphanumeric representation which the application of the network node 310 may convert to second QoS parameters.

and an optional substep of:

505:4 Preparing the response to the client terminal by removing the information on the QoS parameters from the message.

The steps are exemplified in the signalling scheme of FIG. 6, wherein a communication session has been set up according to the above described. The browser of the client terminal 105 issues a "HTTP GET", arrow 605, to the network node 310, here exemplified as a proxy server. The proxy forwards the request (corresponds to step 505:1) to the WWW server, arrow 610. The WWW server prepares a message comprising both the content and information on the required QoS parameters for effective deliverance of the content, and issues the message as a HTTP response to the proxy, arrow 615. The proxy receives the message, reads and analyze the QoS parameters as described in steps 505:2-3, and prepares a message according to step 505:4. The process continues according to the steps 510 and forward of the flowchart of FIG. 5.

A preferred example embodiment, comprising a plurality of the presented substeps and options is illustrated in the flowchart according to FIG. 5b, comprises the steps of:

505: Determining, on an content request issued by the client terminal 105, second QoS parameters, or a representation of second QoS parameters, associated to the requested content by:

505:1 Forwarding the content request to a second network node, for example a service provider server.

505:2 Receiving a message from the second network node as a response of the forwarded content request of step 505:1. Contained within the message is the requested content and information on required QoS parameters for delivering the content to the client terminal 105.

505:3 Reading from the message the information on required QoS parameters and determining second QoS parameters based on said information on required quality of service parameters. The required QoS parameters may be in a format directly usable as the second QoS parameters, a specification of a QoS class or a alphanumeric representation which the application of the network node 310 may convert to second QoS parameters.

505:4 Preparing the response to the client terminal by removing the information on the QoS parameters from the message.

510: Comparing the initial QoS parameters with the second QoS parameters by:

510:1 Accessing the session database 317 to retrieve the PDP information associated with the communication session.

510:2 Reading from the PDP information the initial QoS parameters.

The QoS are preferably stored as "Negotiated QoS" defined in the 3GPP TS 24.008.

510:3 Reading addressing information from the PDP information.

515: Determining if the QoS parameters should be updated, based on the comparison in step 510. If the second QoS parameters indicate a QoS that is higher, i.e. requires higher bearer capacity, than the QoS in use (the initial QoS parameters) a requirement for updating QoS parameters is identified, for effectuating the content delivery. If not, the content delivery may be performed with the initial QoS parameters, i.e. the QoS parameters do not need to be updated. Storing temporarily (substep 515:1) the initial QoS parameters to be used in the optional returning to the initial QoS parameters.

520: Initiate a modification, if a requirement of modification is identified in the determining step, of quality of service parameters by issuing an update from the initial quality of service parameters to the second quality of service parameters.

522: Accessing the session database 317 to update the PDP information with the second QoS parameters.

525: Delivering the requested content to the client terminal 105 with the use of the second QoS parameters.

530: Returning to the use of the initial QoS parameters by issuing an update from the second QoS parameters to the initial QoS parameters similar to step 520.

A suitable format for the combined content and QoS information may be based on Multipurpose Internet Mail Extensions (MIME). MIME refers to an official Internet standard that specifies how messages must be formatted so that they can be exchanged between different systems and has become widely used in for example downloading content via browsers. MIME is a very flexible format, permitting one to include virtually any type of file or document in an email message. Specifically, MIME messages can contain text, images, audio, video, or other application-specific data. A description of MIME can be found in the IETF (Internet Engineering Task Force) publication RFC 1521, 1522.

Figure 7:
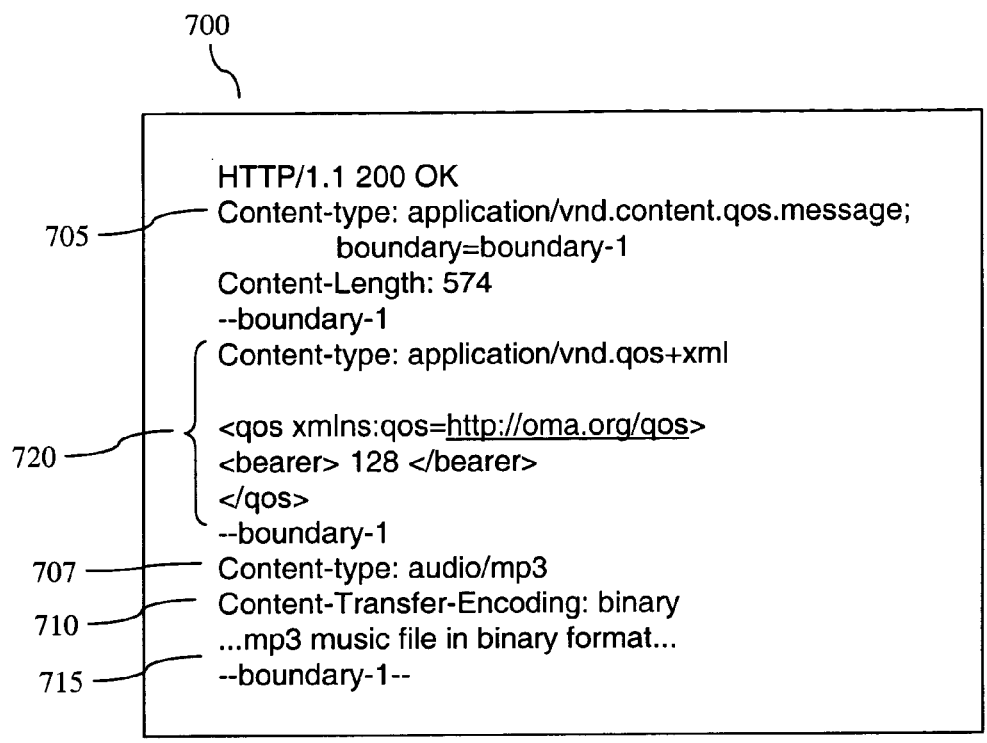
FIG. 7 is a schematic illustration of the MIME-type according to one example embodiment.

In order to meet the demands on flexibility in the use of QoS parameters arising from the varying requirements during a browsing session, a new MIME-type is introduced. The new MIME-type is illustrated in FIG. 7. The MIME-type 700 comprises, among other fields, a main header 705, content-type 707, transfer encoding 710 and content 715, which also is present in the prior art MIME. In the MIME-type according to the invention a new field is introduced, the QoS field 720, specifying the required or desired QoS needed to efficiently transfer the MIME message. The QoS field is preferably, but not necessarily a subfield to the field "content type". The use of the new MIME-type offers an effective way of exchanging the content and the QoS information. One prerequisite is that the application of the network node 310 needs to have knowledge about this particular MIME-type in order to correctly use the QoS information and to prepare a message which is understandable for the client terminal 105.

Figure 8:
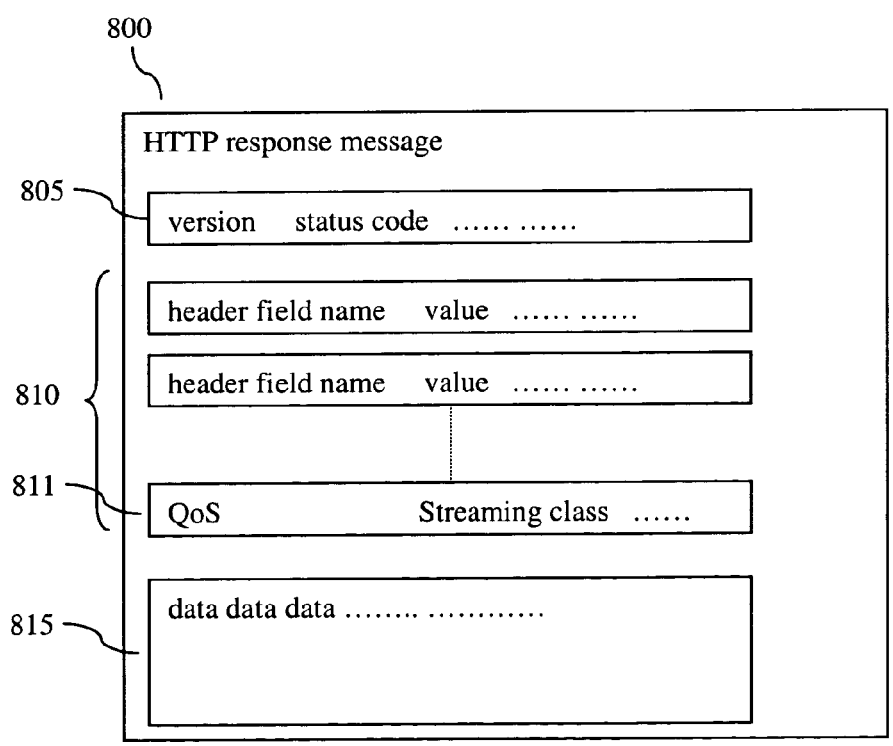
FIG. 8 is a schematic illustration of the HTTP response header according to one example embodiment.

As an alternative to using the modified MIME, the information on QoS can be contained in a HTTP header, which represents an alternative embodiment. In this embodiment, the second network node, e.g. the WWW server, prepares a regular HTTP response message 800, schematically illustrated in FIG. 8, which typically includes a status line 805 indicating version, status code etc, a plurality of header lines 810 which could specify content type and content length, and an entity body 815 comprising the actual data. According to the example embodiment, also QoS information is included in the header, preferably as a QoS line 811 among the other header lines specifying content type, size etc. This message format is very versatile. If, for example, the QoS information provided in the header line 811, is not understandable to the proxy application of the network node 310, this information will simply be discarded and the HTTP response delivered anyway. However, probably not with the optimum QoS parameters.

The term "second QoS parameters" should be interpreted in a broad sense. i.e. not restricted to parameters explicitly specifying a bit rate, for example. The second QoS parameters may, for example, be a representation of the pre-defined UMTS QoS classes or a representation of an acceptable bit rate range. The representations being decodable by the proxy application of the network node.

In a further example embodiment, the second QoS parameters comprises at least two representations of different QoS levels or classes. A first representation, the desired QoS level, specifying a level (bit rate, for example) to which the content is adapted, and a second representation, the minimum QoS level, specifying the lowest QoS level with which the delivery can still be performed. The application of the network nod may then, upon a negative response to the desired QoS level, either from the policy check or in the Update PDP context response, chose the minimum QoS level, or a level in-between, for the delivery of the content.

Figure 3B:
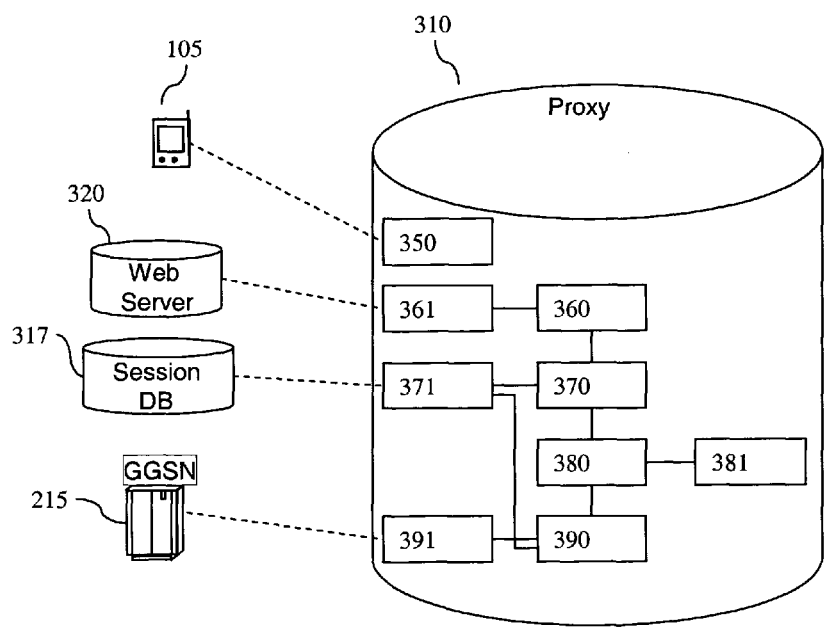

The network node 310 comprises a plurality of functional parts, preferably implemented as software code means, to be adapted to effectuate the method according to the invention. In FIG. 3b are the main functional parts, which are involved in an change of QoS during a communication session, schematically depicted. The terms "comprising" and "connected" should here be interpreted as links between functional parts and not necessarily physical connections.

The network node comprises communication means 350 for communicating on an application level with a client terminal 105 and QoS determining means 360, adapted to, on an content request issued by the client terminal 105, determine second QoS parameters associated to the requested content. The QoS determining means 360 preferably comprises, or is connected to interface means 361 for interfacing a second network node which is adapted to forwarding and receiving messages to and from the second network node, and adapted to read or decode the messages from the second network node, especially to read QoS information contained in the messages.

The comparing means 370 of the network node 310 is adapted to compare the initial QoS parameters with the second QoS parameters and is therefore preferably connected to a session database interface 371 for accessing the session database 317 to retrieve the PDP information associated with the communication session and is adapted to read the initial QoS parameters and possibly also addressing information from the PDP information.

The updating determining means 380 is adapted to determine if the QoS parameters should be updated, based on the comparison provided by the comparing means 370. The updating determining means 380 identifies requirement for updating QoS parameters if the second QoS parameters indicate a QoS that is higher, i.e. requires higher bearer capacity, than the QoS in use (the initial QoS parameters). The updating determining means 380 may comprise, or be connected to storing means 381 for storing the initial QoS parameters.

The QoS modification means 390 is adapted to issue an update from the initial quality of service parameters to the second quality of service parameters, by the use of update PDP context message. The update PDP context message should be directed to the appropriate GGSN 215 and is therefore provided with, or connected to, GGSN interface means 391. The QoS modification means may further be adapted to retrieve addressing information from the PDP information and is therefore connected to the session database interface 371.

The example embodiments allow the network node 310, or an application of the network node, to initiate and control the change of QoS parameters during an ongoing communication session and whereby better adapted to the varying demands of transfer capacity typically experienced in a browsing/downloading session. This is possible since the present invention provides the possibility for the network node to determine second QoS parameters, compare them with initial QoS parameters and modify, or suggest a modification of, the QoS parameters used in the communication session, if needed.

In the drawings and specification, there have been disclosed example embodiments and, although specific terms are employed, they are used in a generic and descriptive sense only and not for purposes of limitation, the scope of the invention being set forth in the following claims.

The invention claimed is:

1. A method in a network node in a mobile communication network for changing quality of service parameters during an ongoing communication session wherein at least one client terminal utilizes services provided via the network node, and wherein initial quality of service parameters are used in the ongoing communication session, the method comprises the steps of:

determining, upon a content request issued by the at least one client terminal, second quality of service parameters associated to a response to said request;

comparing the initial quality of service parameters with the second quality of service parameters to determine a requirement for modifying quality of service parameters; and modifying, if a requirement of modification is identified in the comparing/determining steps, quality of service parameters by issuing to the client terminal, an update from the initial quality of service parameters to the second quality of service parameters, and thereby facilitating a delivery of a response to the content request with the use of the second quality of service parameters, wherein the steps of comparing quality of service parameters comprises a substep of retrieving PDP information on the initial quality of service parameters from a session database, the PDP information being associated with the communication session.

2. The method according to claim 1, further comprising: reading from the PDP information the initial QoS parameters.

3. The method according to claim 2, wherein the substep of retrieving information further comprises a step of:
reading addressing information from the PDP information.

4. The method according to claim 3, wherein the addressing information comprises an NAS IP address which is used by the network node to identify the GGSN which is controlling part of the communication with the client terminal.

5. The method according to claim 3, wherein the addressing information comprises IMSI or MSISDN for the client terminal, which IMSI or MSISDN the network node is included in a message to the GGSN for identifying the GTP associated with the ongoing communication session.

6. The method according to claim 2, further comprising the steps of:
storing the initial quality of service parameters; and
returning to the use of the initial quality of service parameters after completion of the communication session.

7. The method according to claim 1, wherein in the step of comparing quality of service parameters, a requirement for modifying quality of service parameters is identified if the initial quality of service parameters differ from the second quality of service parameters.

8. The method according to claim 7, wherein in the step of comparing quality of service parameters, a requirement for modifying quality of service parameters is identified if the initial quality of service parameters correspond to a lower transfer rate than the transfer rate corresponding to the second quality of service parameters.

9. The method according to claim 8, further comprising the steps of:
storing the initial quality of service parameters; and
returning to the use of the initial quality of service parameters after completion of the communication session.

10. The method according to claim 8, wherein the initial quality of service parameters is a representation of a first quality of service class and the second quality of service parameters is a representation of a second quality of service class.

11. The method according to claim 10, wherein the first and second quality of service classes are from the group of predefined UMTS quality of service classes comprising: conversational class, streaming class, interactive class and background class.

12. The method according to claim 1, further comprising the steps of:
storing the initial quality of service parameters; and
returning to the use of the initial quality of service parameters after completion of the communication session.

13. The method according to claim 12, further comprising the step of:
accessing (522) a session database to update the PDP information with the second QoS parameters.

14. The method according to claim 1, wherein in the step of determining second QoS parameters comprises the substeps of:
receiving a message from a second network comprising the content and information on at least the file type of the content; and
determining second QoS parameters based on said information on the file type of the content by comparison with a predetermined list, said list linking file types to suitable QoS parameters.

15. The method according to claim 14, further comprising the steps of:
storing the initial quality of service parameters; and
returning to the use of the initial quality of service parameters after completion of the communication session.

16. The method according to claim 14, wherein the message further comprise information on the size of the content file; and said list links file types in predetermined file size ranges to suitable QoS parameters.

17. The method according to claim 1, wherein in the step of determining second QoS parameters comprises the substeps of:
receiving a message from a second network as a response of the content request, wherein the requested content and information on required QoS parameters for delivering the content to the client terminal are comprised within said message; and
reading from the message the information on required QoS parameters and determining second QoS parameters based on said information on required quality of service parameters.

18. The method according to claim 17, further comprising the steps of:
storing the initial quality of service parameters; and
returning to the use of the initial quality of service parameters after completion of the communication session.

19. The method according to claim 17, further comprising a step of preparing the response to the client terminal by removing the information on the required QoS parameters from the message.

20. The method according to claim 17, wherein the message is a dedicated MIME-type.

21. The method according to claim 17, wherein the message comprises at least one content part and at least one header part and the quality of service information is provided in the header part.

22. The method according to claim 21, wherein the message is a HTTP response message and the required quality of service information is provided in a header line.

23. A memory for a computer storing a computer program comprising software code adapted for controlling the computer to implement the steps of claim 1.

24. A non-transitory computer-readable medium comprising a computer program adapted for causing a data processor in a processing unit within a network node to control execution of the steps of claim 1.

25. A network node in a mobile communication network adapted to provide access to services from a service provider in a communication session, wherein a client terminal utilizes services provided via the network node and initial quality of service parameters are used, the network node comprising:
a quality of service determining processor arranged to, on an content request issued by the client terminal, determine second quality of service parameters associated to the requested content;

a comparator arranged to compare the initial quality of service parameters with the second quality of service parameters; and a quality of service modification processor arranged to issue an update from the initial quality of service parameters to the second quality of service parameters using an update PDP context message to facilitate a delivery of a response to the content request with the use of the second quality of service parameters, wherein the comparator is arranged to retrieve PDP information on the initial quality of service parameters from a session database, the PDP information being associated with the communication session.

26. The network node according to claim 25, further comprising:

an updating determining processor arranged to determine if quality of service parameters in an ongoing communication session should be updated, based on the comparison provided by the comparator, and to identify a requirement for updating quality of service parameters if the second quality of service parameters indicate a quality of service different from a quality of service indicated by the initial quality of service parameters.

27. The network node according to claim 26, wherein the updating determining processor comprises a memory for storing the initial quality of service parameters.

28. The network node according to claim 27, wherein the quality of service modification processor is arranged for communication with a GGSN interface for providing communication facilities to at least one GGSN.

29. The network node according to claim 25, wherein the quality of service determining processor is arranged for communication with an interface for interfacing a second network node, said interface being arranged to forward and receive messages to and from the second network node and to read or decode the messages from the second network node.

30. The network node according to claim 29, wherein the interface is arranged to read quality of service information contained within a messages from the second network node.

31. The network node according to claim 30, wherein the comparator is arranged for communication with a session database interface for accessing a session database to retrieve PDP information associated with the communication session.

32. The network node according to claim 31, wherein the session database interface is arranged to read addressing information from the PDP information.

33. The network node according to claim 31, wherein the session database interface is arranged to read the initial quality of service parameters from the PDP information.

34. The network node according to claim 33, wherein the session database interface is arranged to read addressing information from the PDP information.

35. The network node according to claim 25, further comprising updating determining means adapted to determine if quality of service parameters in an ongoing communication session should be updated, based on the comparison provided by the comparator, said updating determining means is adapted to identify a requirement for updating quality of service parameters if the second quality of service parameters indicate a quality of service different from a quality of service indicated by the initial quality of service parameters.

36. The network node according to claim 35, wherein the updating determining means comprises storing means for storing the initial quality of service parameters.

37. The network node according to claim 25, wherein the quality of service modification processor is arranged for communication with a GGSN interface for providing communication facilities to at least one GGSN.

38. The network node according to claim 25, wherein the quality of service modification processor is arranged for communication with the session database interface to retrieve addressing information from the PDP information.

* * * * *

UNITED STATES PATENT AND TRADEMARK OFFICE
CERTIFICATE OF CORRECTION

PATENT NO.       : 7,817,554 B2
APPLICATION NO.  : 11/171279
DATED            : October 19, 2010
INVENTOR(S)      : Skog et al.

It is certified that error appears in the above-identified patent and that said Letters Patent is hereby corrected as shown below:

On the Face Page, in Field (75), under "Inventors", in Column 1, Line 1,
delete "Hasselby" and insert -- Hässelby --, therefor.

On Page 2, in Field (56), under "OTHER PUBLICATIONS", in Column 2, Line 4,
delete "2');" and insert -- 2+); --, therefor.

In Column 2, Line 45, delete "than the already in use." and
insert -- than that already in use. --, therefor.

In Column 4, Line 11, delete "an" and insert -- a --, therefor.

In Column 4, Line 57, delete "embodiment of;" and insert -- embodiment; --, therefor.

In Column 4, Line 67, after "embodiments", insert -- are --.

In Column 6, Line 4, delete "FIG. 6" and insert -- FIG. 6. --, therefor.

In Column 6, Line 8, delete "an" and insert -- a --, therefor.

In Column 8, Line 67, after "in a various of ways." and insert -- performed in various
ways. --, therefor.

In Column 9, Line 17, delete "file;" and insert -- file. --, therefor.

In Column 9, Line 42, delete "a alphanumeric" and insert -- an alphanumeric --, therefor.

In Column 9, Line 46, delete "and" and insert -- There is --, therefor.

In Column 10, Lines 16-17, delete "a alphanumeric" and insert -- an alphanumeric --, therefor.

Signed and Sealed this
Thirtieth Day of August, 2011

David J. Kappos
*Director of the United States Patent and Trademark Office*

CERTIFICATE OF CORRECTION (continued)
U.S. Pat. No. 7,817,554 B2

In Column 11, Line 39, delete "sense." and insert -- sense, --, therefor.

In Column 11, Line 60, delete "an" and insert -- a --, therefor.

In Column 14, Line 18, in Claim 16, delete "comprise" and insert -- comprises --, therefor.

In Column 16, Line 3, in Claim 30, after "within a messages from" and insert -- within a message from --, therefor.